March 10, 1936.  L. J. TETLOW  2,033,659
AIRCRAFT BRAKE
Filed Dec. 29, 1932
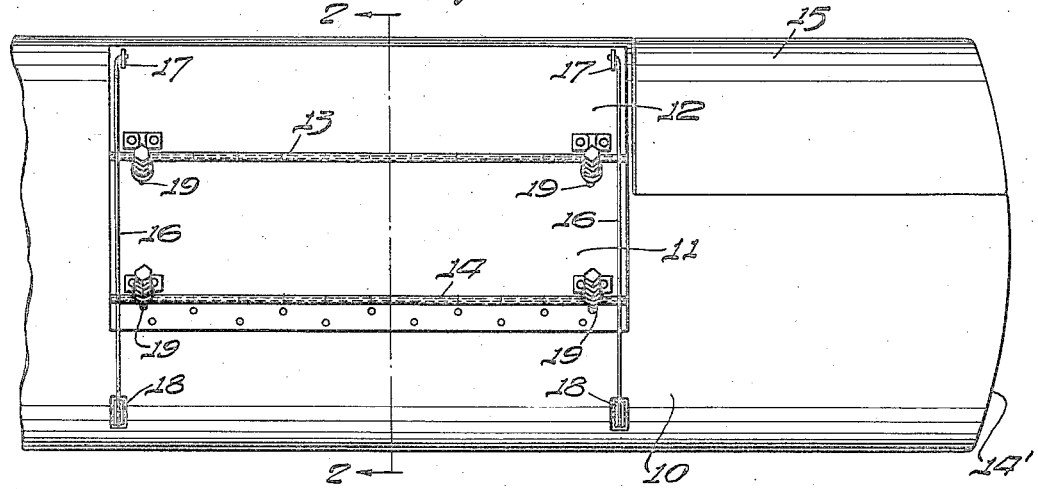
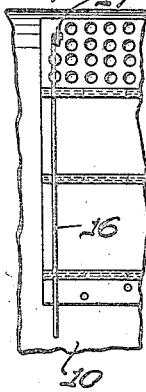
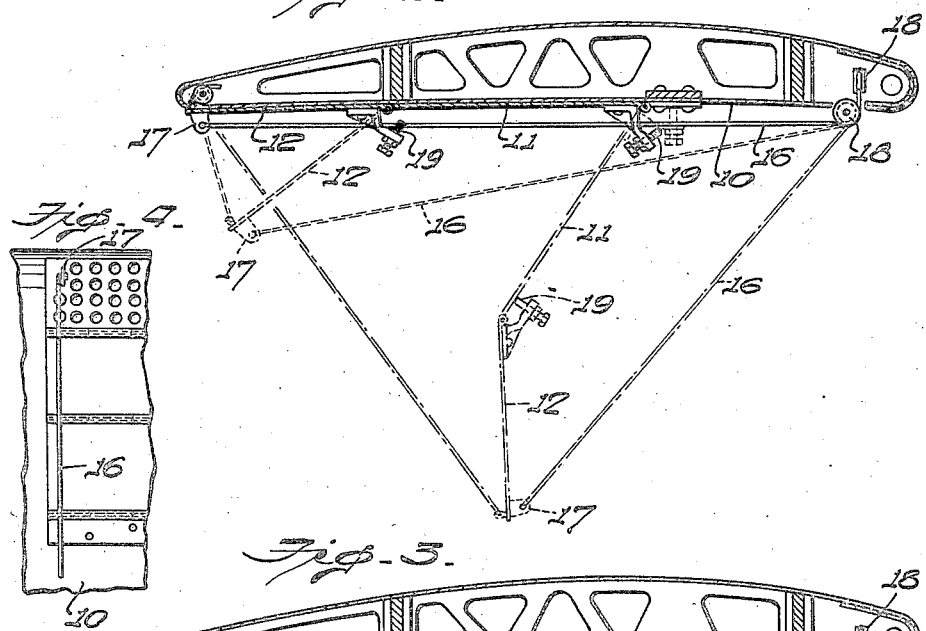
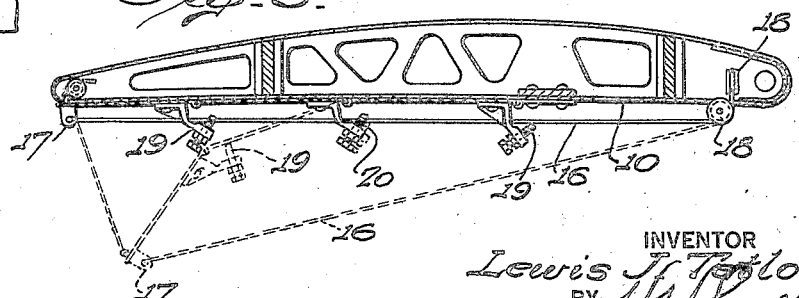
INVENTOR
Lewis J. Tetlow
BY H. H. Snelling
ATTORNEY Patented Mar. 10, 1936

2,033,659

UNITED STATES PATENT OFFICE 2,033,659

AIRCRAFT BRAKE

Lewis J. Tetlow, Holyoke, Mass.

Application December 29, 1932, Serial No. 649,410

12 Claims. (Cl. 244—29)

This invention relates to brakes for aircraft and especially to brakes of the type attached to the wings of airplanes.

The main object is to provide a brake of greater efficiency than those that have been used heretofore. In particular the object of the invention is to provide a brake or vane having a variable broken surface whereby the braking force may be applied to the airplane with a minimum of effort.

One of the best brakes used on airplanes is the type consisting of a vane lying in the under surface of the wing and hinged along the forward edge with its free edge lying substantially flush with the trailing edge of the wing. I have discovered that the braking effect of such a vane can be increased greatly by constructing it in two or more articulated parts and providing means for consecutively turning these parts into the wind stream as desired. This arrangement has another advantage in that it is much easier operated than the old type single piece vane. An additional object of my invention is to provide adjustable means for determining the maximum angle of the braking surfaces thereby to accommodate the brake to various airplane, speeds, weather condition, etc.

In the drawing:—

Figure 1 is a bottom plan view of a wing on which my improved braking means is attached.

Figure 2 is a section on line 2—2 of Figure 1.

Figure 3 shows a modification.

Figure 4 is a further modification.

Although my new brake may be used upon any surface of any type of air craft, I have shown it in Figure 1 as applied to the under surface of the wing 10 of an airplane. The brake consists of at least two sections 11 and 12 hinged to each other at 13 and to the wing at 14 so that the trailing edge of section 12 lies substantially along the corresponding edge of the wing; although shown as piano hinges the joints 13 and 14 may be of any type desired for example, a smooth joint is made by the use of some flexible material such as fabric or leather. As shown the brake is preferably spaced from the free end 14' of the wing in order that it shall not interfere with the aileron 15 and also to avoid putting too much stress on the wing spars. However its exact location will be determined to a great extent by the design of the craft on the wings of which it is to be applied.

The brake operating mechanism may be of any type desired but I prefer to use a cable 16 connected at one end to an operating mechanism (not shown) and connected at the other end to a bracket 17 on the trailing section 12 of the vane. The cable is threaded through the necessary pulleys such as 18 properly located in the wing structure. It will be seen that a pull on the cable 16 first draws section 12 from the wing surface and about the axis 13, this movement about the axis is limited by the adjustable stops 19 and a further pull on the cable draws the second section 11 from the wing surface along with the section 12 thus forming a pocket under the wing. When more than two sections are used, as in Figure 3, additional stops 20 will be provided on the middle sections.

The relative depths of the sections is preferably but not necessarily that illustrated where the section hinged to the plane is the deepest and the trailing section is the shallowest. Also the relative areas of the wing and brake may be any ratio desired it being preferred however to have the area of the brake vane about one-fourth the area of the wing. In most cases the ratio of areas will be determined by the type of aircraft and the braking speed desired. One method of changing the ratio of areas is shown in Figure 4 in which the trailing section is shown as being perforated; by perforating the section the braking area of the brake is reduced without reducing the effective length of the vane.

What I claim is:

1. In a device of the character described, the combination with an airplane wing of a vane hinged to lie along one horizontal surface of said wing, a second vane hinged to the free end of said first vane, means for moving the vanes into baffle position and means for limiting the angular relation of the second vane to the first vane as the vanes are moved into baffle or braking position.

2. The device of claim 1 in which the means for limiting the angular relation of the vanes is adjustable.

3. The device of claim 1 including a third vane and adjustable means between the second and third vanes for limiting the angular relation of the second and third vanes independently of the limiting means between the first and second vanes.

4. The device of claim 1 in which the vanes are of the same width and the first vane is deeper than the second vane.

5. The device of claim 1 in which the first vane is centrally positioned on the wing and the total depth of the vanes is approximately two-thirds of the depth of the wing.

6. The device of claim 1 in which the first vane is pivoted along its entire width to the wing, the second vane is pivoted to the first vane along its entire length and the limiting means consists of a plurality of brackets each carrying an adjustable stop.

7. The device of claim 1 in which the trailing edge of the vane when not in braking position lies along the trailing edge of the wing.

8. The device of claim 1 in which the vane is hinged to the surface of the wing along a line forward of the central longitudinal axis of the wing.

9. The device of claim 1 in which the vane is hinged to the under surface of the wing along a line forward of the center and the trailing edge of the vane is adapted to lie along the trailing edge of the wing.

10. In a device of the character described, the combination with an airplane wing of a vane hinged at its forward edge to a surface of said wing on a line forward of the trailing edge of the wing and adapted to lie against said surface, a second vane hinged to the free edge of the first mentioned vane, and means for moving one or both of said vanes into baffle position.

11. The device of claim 10 in which means are provided at one of said hinged edges for limiting the angular movement of the adjacent vane about its hinge.

12. The device of claim 10 in which the trailing edge of the second vane lies adjacent the trailing edge of the wing.

LEWIS J. TETLOW.